US012789354B2

(12) United States Patent
Dykstra

(10) Patent No.: US 12,789,354 B2
(45) Date of Patent: Nov. 10, 2026

(54) MODULAR TOOL RACK KIT FOR RELOADING DIES

(71) Applicant: Greg Dykstra, Meadow, SD (US)

(72) Inventor: Greg Dykstra, Meadow, SD (US)

( * ) Notice: Subject to any disclaimer, the term of this patent is extended or adjusted under 35 U.S.C. 154(b) by 0 days.

(21) Appl. No.: 19/025,653

(22) Filed: Jan. 16, 2025

(65) Prior Publication Data

US 2026/0200069 A1 Jul. 16, 2026

(51) Int. Cl.

| | |
|---|---|
| ***B25H 3/04*** | (2006.01) |
| ***G09F 23/00*** | (2006.01) |
| *F42B 33/10* | (2006.01) |

(52) U.S. Cl.

CPC ............... *B25H 3/04* (2013.01); *G09F 23/00* (2013.01); *F42B 33/10* (2013.01)

(58) Field of Classification Search

CPC .......... B25H 3/04; F42B 33/10; F42B 33/004; F42B 5/188; Y10T 70/5022; A47B 81/005; G09F 23/00

See application file for complete search history.

(56) References Cited

U.S. PATENT DOCUMENTS

| | | | | |
|---|---|---|---|---|
| 1,607,894 A * | 11/1926 | Johnson | B43K 25/024 40/658 |
| 3,095,092 A * | 6/1963 | Magarian | B25H 3/04 211/89.01 |
| 3,580,127 A | 5/1971 | Lee | |
| 4,425,833 A | 1/1984 | Purdie | |
| 4,742,630 A * | 5/1988 | Scumaci | G09F 23/00 40/333 |
| 5,309,813 A | 5/1994 | Henley | |
| 5,341,717 A | 8/1994 | Feldman | |
| 6,109,569 A * | 8/2000 | Sakaida | F16L 3/222 248/62 |
| 6,233,858 B1 * | 5/2001 | Brach, Jr. | G09F 23/00 40/658 |
| 6,332,247 B1 * | 12/2001 | Hsieh | B43K 25/02 24/11 R |
| 6,431,373 B1 * | 8/2002 | Blick | B25H 3/003 206/378 |
| 6,932,223 B1 * | 8/2005 | Lee | B25H 3/04 206/349 |
| 7,185,770 B1 * | 3/2007 | Roten | A47B 81/00 211/70.6 |
| 7,503,459 B2 * | 3/2009 | Grayson | A47F 7/0028 211/70.8 |
| 7,681,481 B1 | 3/2010 | Buckley | |
| D688,596 S * | 8/2013 | Dunn | D11/184 |
| 9,127,919 B2 | 9/2015 | Holland | |

(Continued)

*Primary Examiner* — Ko H Chan

(57) ABSTRACT

A modular tool rack kit for storing reloading dies on a wall includes a plurality of tool supports. Each tool support comprises a body which includes a base and a receiver. The receiver of each tool support defines a notch which is open on a front side of the body and extends through a top side and a bottom side of the body. The notch is sized to accommodate a reloading die therein such that the reloading die extends vertically through the notch. Each tool support further includes first and second connection members on either side of the body such that the tool supports may be attached together in a linear path. Additional structure may be provided to secure the reloading dies to the rack and label the reloading dies.

12 Claims, 9 Drawing Sheets

(56) References Cited

U.S. PATENT DOCUMENTS

| | | | | |
|---|---|---|---|---|
| 9,200,880 | B1 | 12/2015 | Foren | |
| 9,297,628 | B2 | 3/2016 | Sluder, III | |
| 9,644,931 | B1 | 5/2017 | Cauly, Jr. | |
| 10,252,411 | B2 * | 4/2019 | Su | F16B 2/22 |
| 10,265,774 | B1 | 4/2019 | Eldredge | |
| 10,439,381 | B1 * | 10/2019 | Mohlman | H02G 3/0406 |
| 10,794,676 | B1 | 10/2020 | Aerni | |
| 11,110,589 | B2 * | 9/2021 | Hurley | H01F 7/0252 |
| 2011/0011813 | A1 * | 1/2011 | Kao | B25H 3/04 211/70.6 |
| 2012/0175277 | A1 * | 7/2012 | Hutchens | B25H 3/02 206/372 |
| 2016/0223302 | A1 | 8/2016 | Bowers | |
| 2020/0406427 | A1 * | 12/2020 | Yeh | F16B 2/06 |

* cited by examiner

MODULAR TOOL RACK KIT FOR RELOADING DIES

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tool racks and more particularly pertains to a new tool rack for storing reloading dies on a wall or other support structure.

(2) Description of Related Art Including Information Disclosed Under 37 CFR 1.97 and 1.98

Reloading dies are tools used in assembling a bullet cartridge from a round that has previously been used. Various dies of differing sizes and structures are used to perform various operations in assembling bullet cartridges and are adapted to cartridges of different sizes. Typical racks for storing such devices provide a ring that defines a hole and may include a tray underneath the ring. The tray supports the weight of the reloading die while the ring prevents the die from tipping over. However, it may be advantageous to store reloading dies differently.

The prior art fails to disclose a modular rack in which multiple tool supports have rails or other connectors such that they may be attached together to provide a continuous rack with multiple locations for holding multiple reloading dies. Such a modular rack may also have a receiver shaped to seat a locking shaft collar, which is a component of a reloading die which is typically mounted around a threaded shaft of the reloading die and is used to set a height of particular elements of the reloading die during use. The modular rack may include this receiver which seats the shaft locking collar and a snap-fitting clamp which grasps the shaft of the reloading die. In this manner, a variety of differently sized reloading dies may be held by seating the locking shaft collar and grasping the shaft. The prior art fails to disclose a modular rack which includes these elements.

(h) BRIEF SUMMARY OF THE INVENTION

An embodiment of the disclosure meets the needs presented above by generally comprising a plurality of tool supports. Each tool support of the plurality of tool supports comprises a body with a front side and a back side, a top side and a bottom side which each extend between the front side and the back side, and a first lateral side and a second lateral side which each extend between the front side and the back side and between the top side and the bottom side. The body further comprises a base and a receiver, wherein the base extends between the back side of the body and the receiver, and the receiver extends between the base and the front side of the body. The receiver defines a notch which is open on the front side of the body and extends through the top side and the bottom side of the body. The notch is sized and configured to receive a reloading die therein. A first connection member and a second connection member are coupled to the body. The first connection member is positioned on the first lateral side of the body, and the second connection member is positioned on the second lateral side of the body. The first connection member of each tool support is removably couplable to a second connection member of another tool support of the plurality of tool supports.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
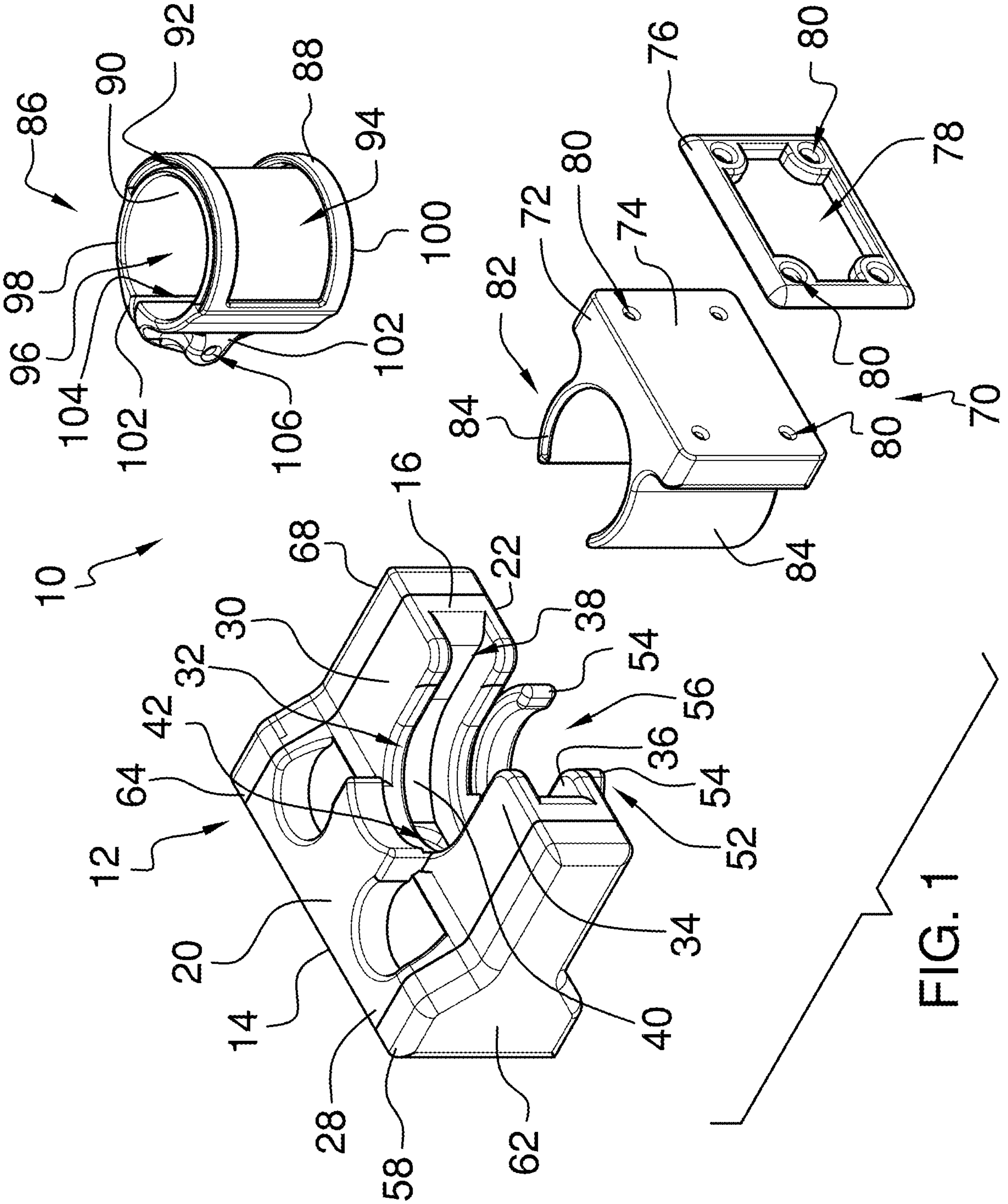
FIG. 1 is a perspective kit view of a modular tool rack kit according to an embodiment of the disclosure.
Figure 2:
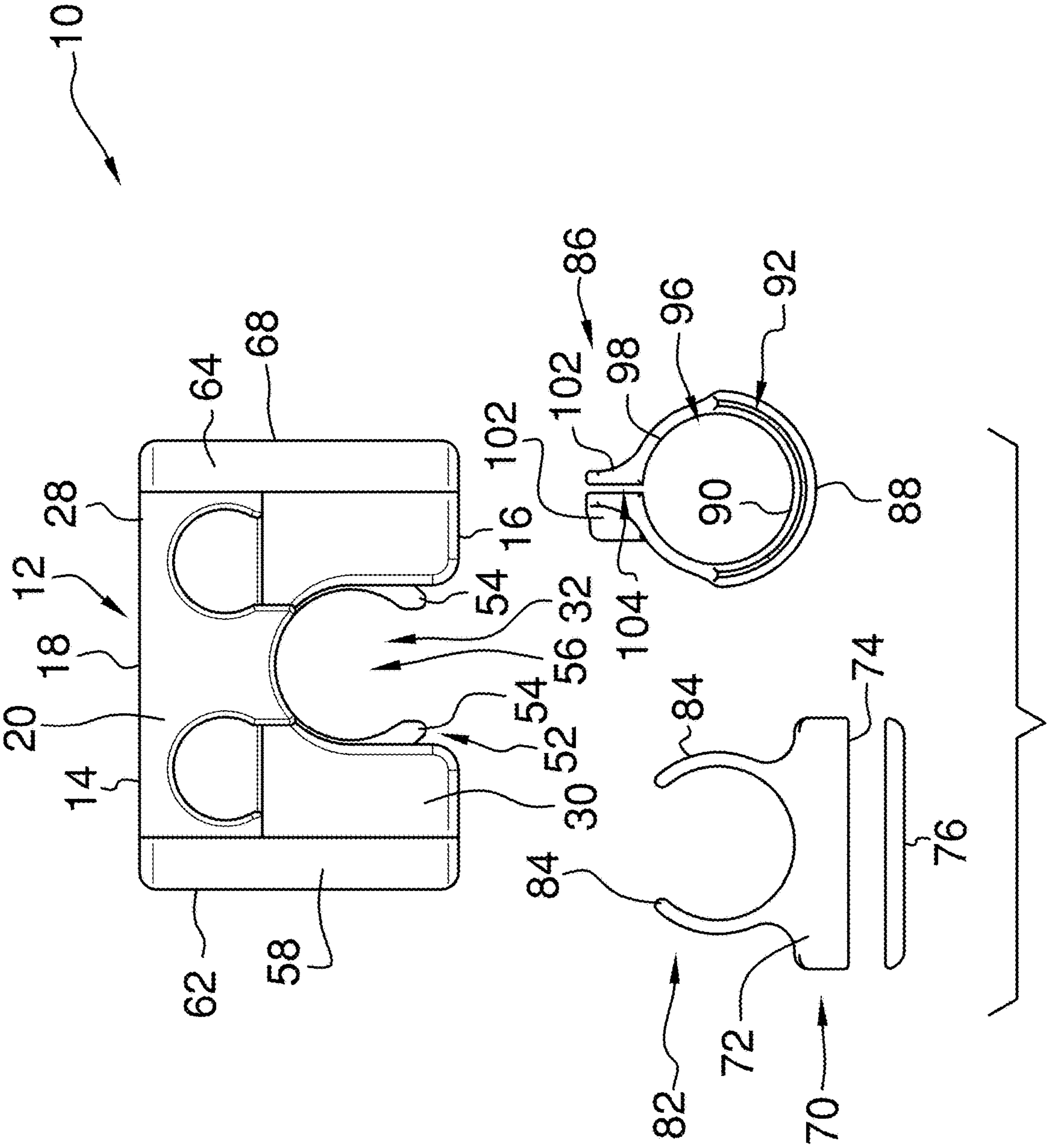
FIG. 2 is a top kit view of an embodiment of the disclosure.
Figure 3:
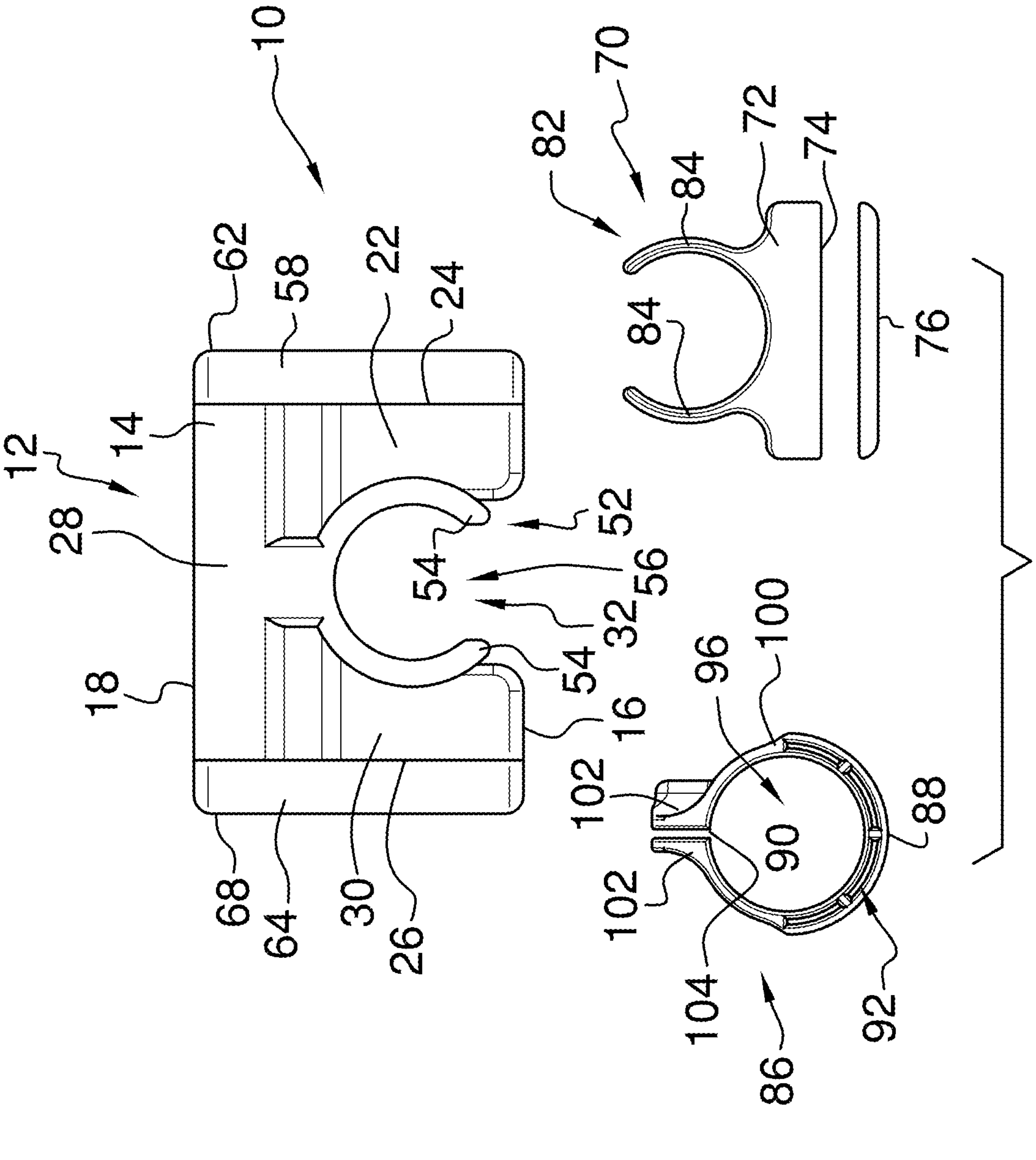
FIG. 3 is a bottom kit view of an embodiment of the disclosure.
Figure 4:
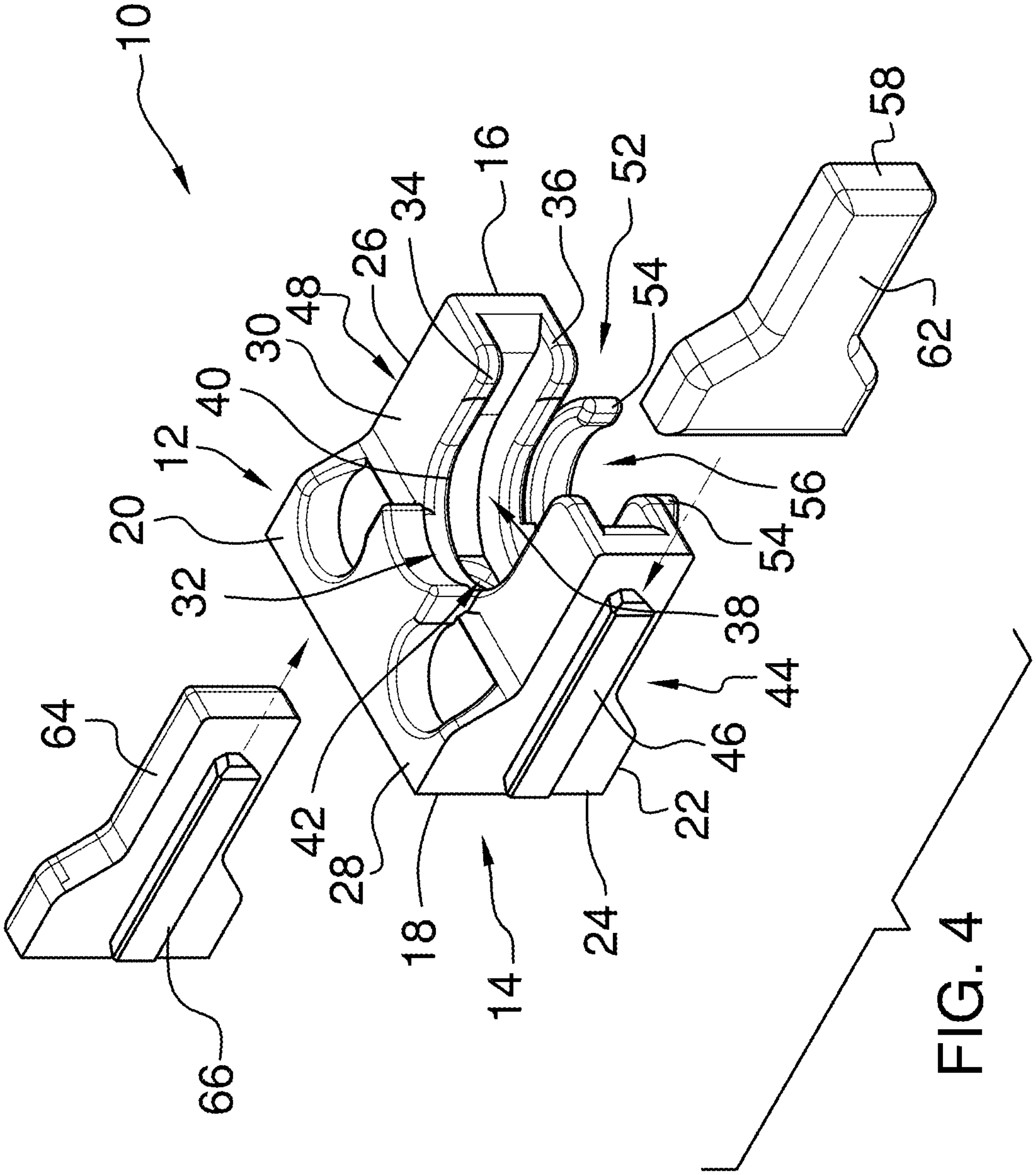
FIG. 4 is a top exploded perspective view of a tool support, a first end cap, and a second end cap of an embodiment of the disclosure.
Figure 5:
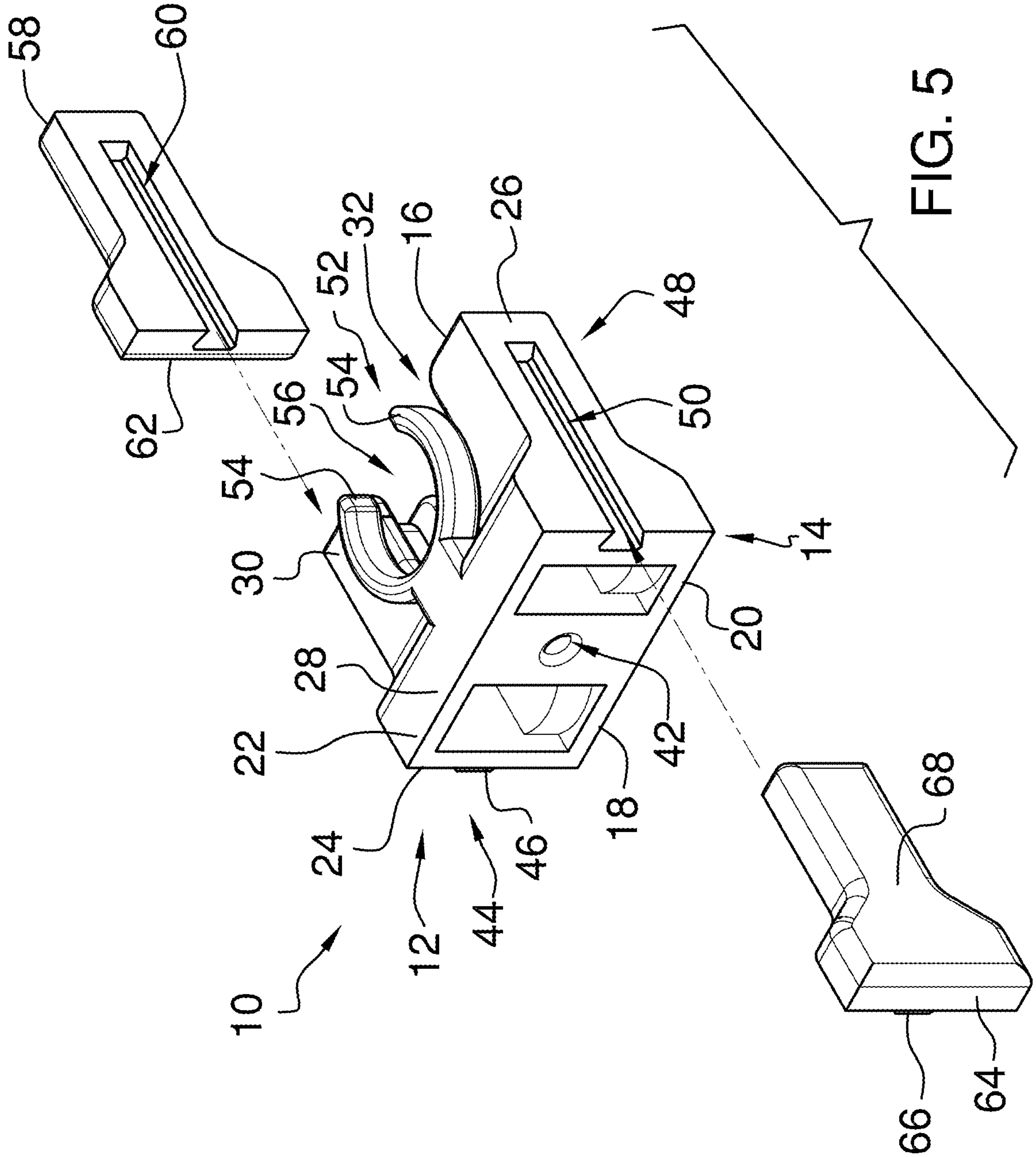
FIG. 5 is a bottom exploded perspective view of a tool support, a first end cap, and a second end cap of an embodiment of the disclosure.
Figure 6:
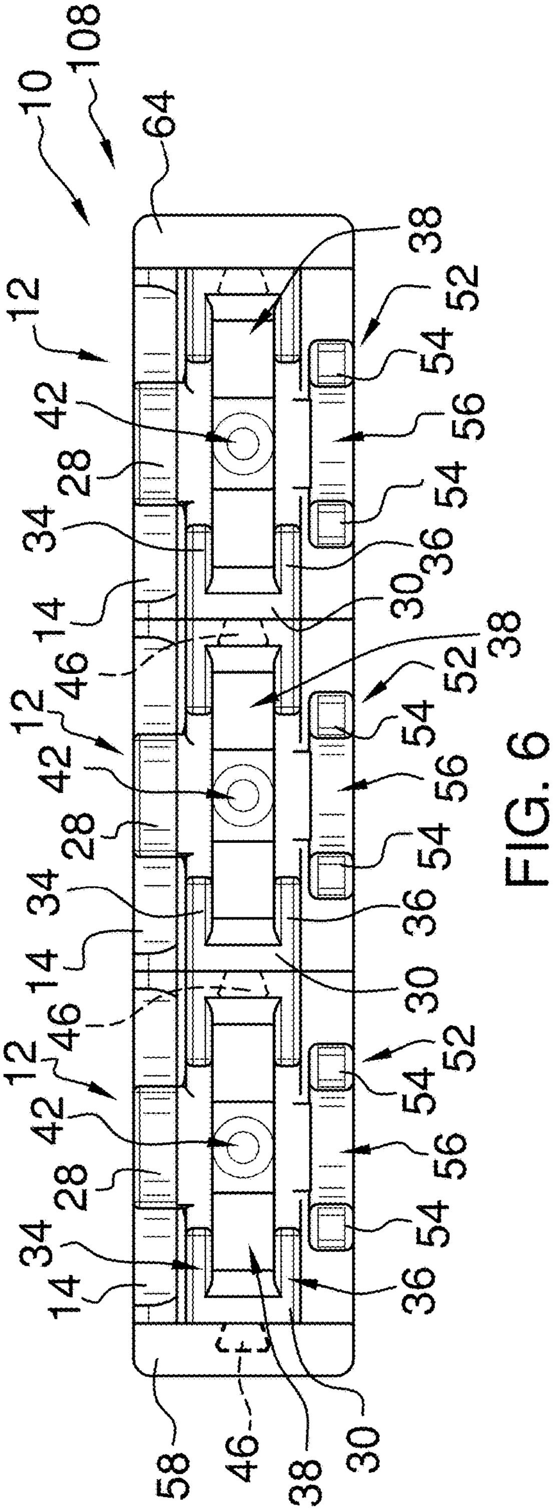
FIG. 6 is a front view of an assembly of multiple tool supports, a first end cap, and a second end cap of an embodiment of the disclosure.
Figure 7:
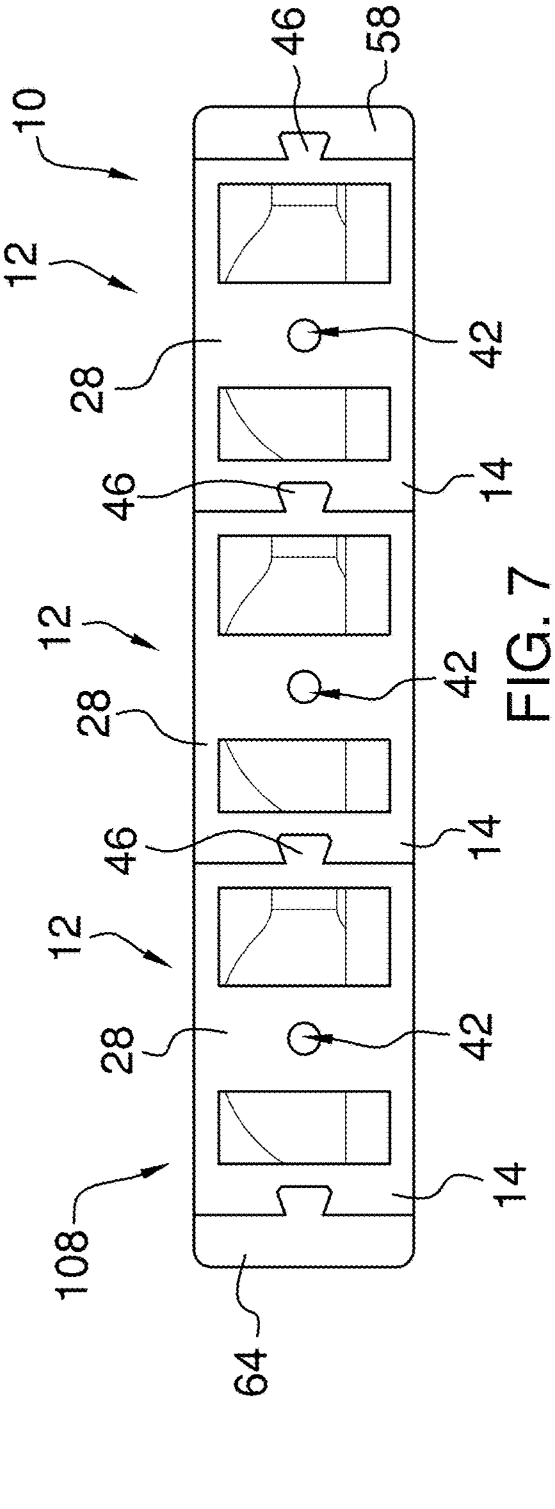
FIG. 7 is a back view of an assembly of multiple tool supports, a first end cap, and a second end cap of an embodiment of the disclosure.
Figure 9:
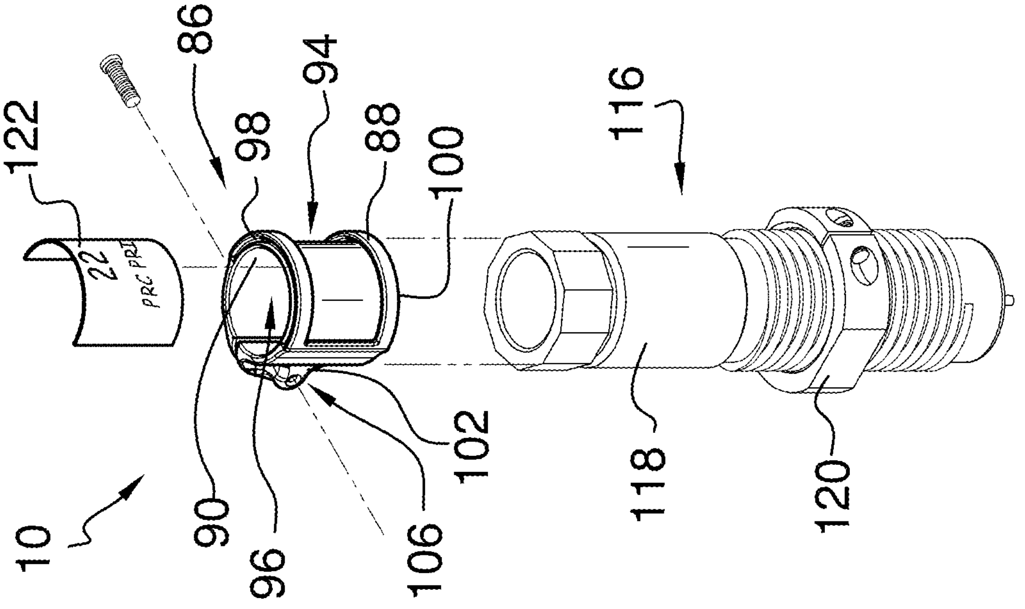
FIG. 9 is an exploded perspective view of a windowed label holder of an embodiment of the disclosure and a reloading die.
Figure 8:
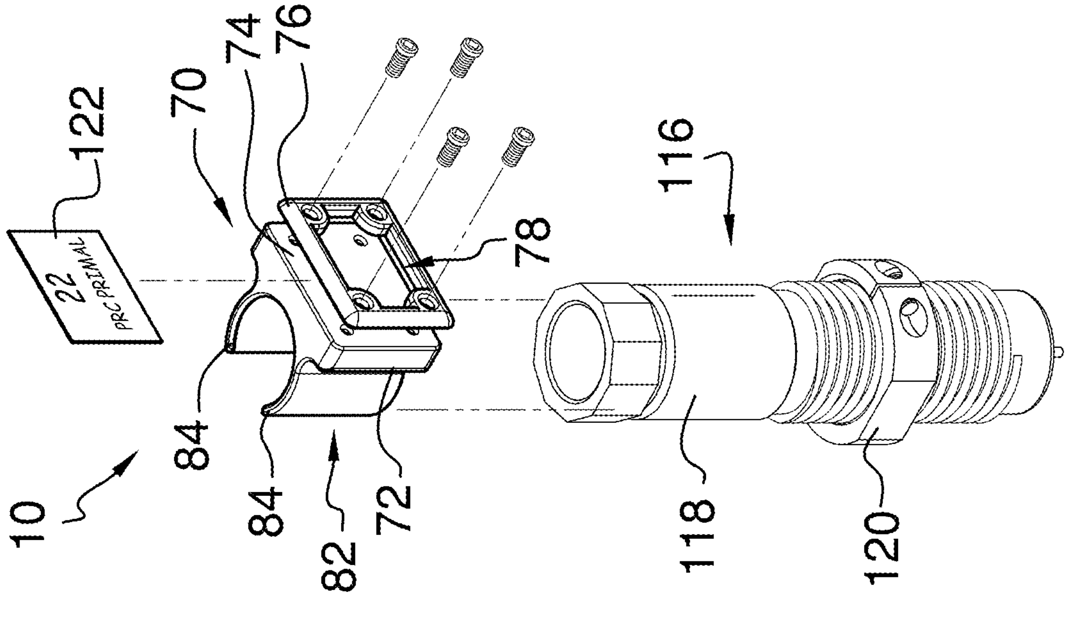
FIG. 8 is an exploded perspective view of a framed label holder of an embodiment of the disclosure and a reloading die.
Figure 10:
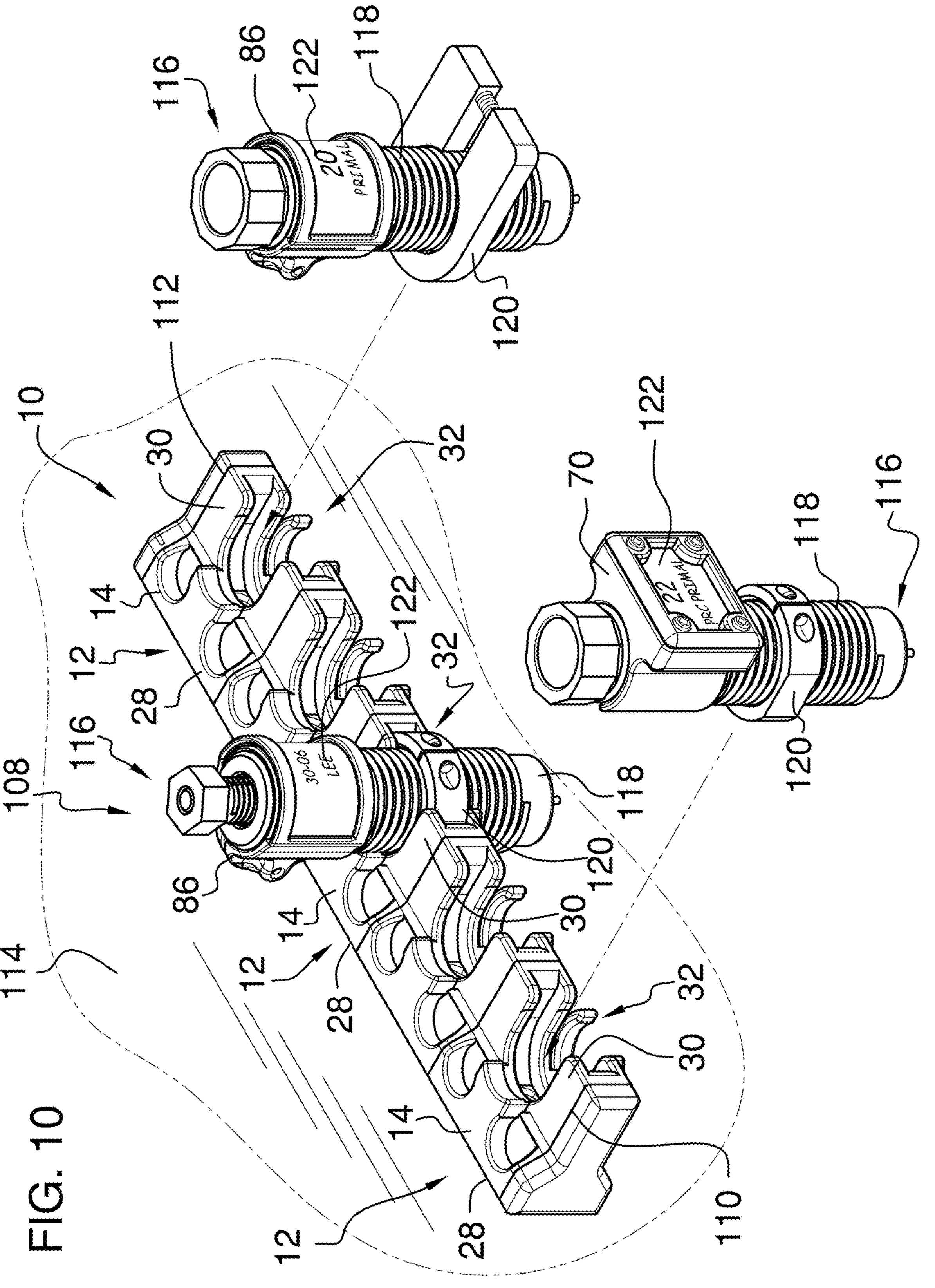
FIG. 10 is a perspective in-use view of an embodiment of the disclosure.
Figure 11:
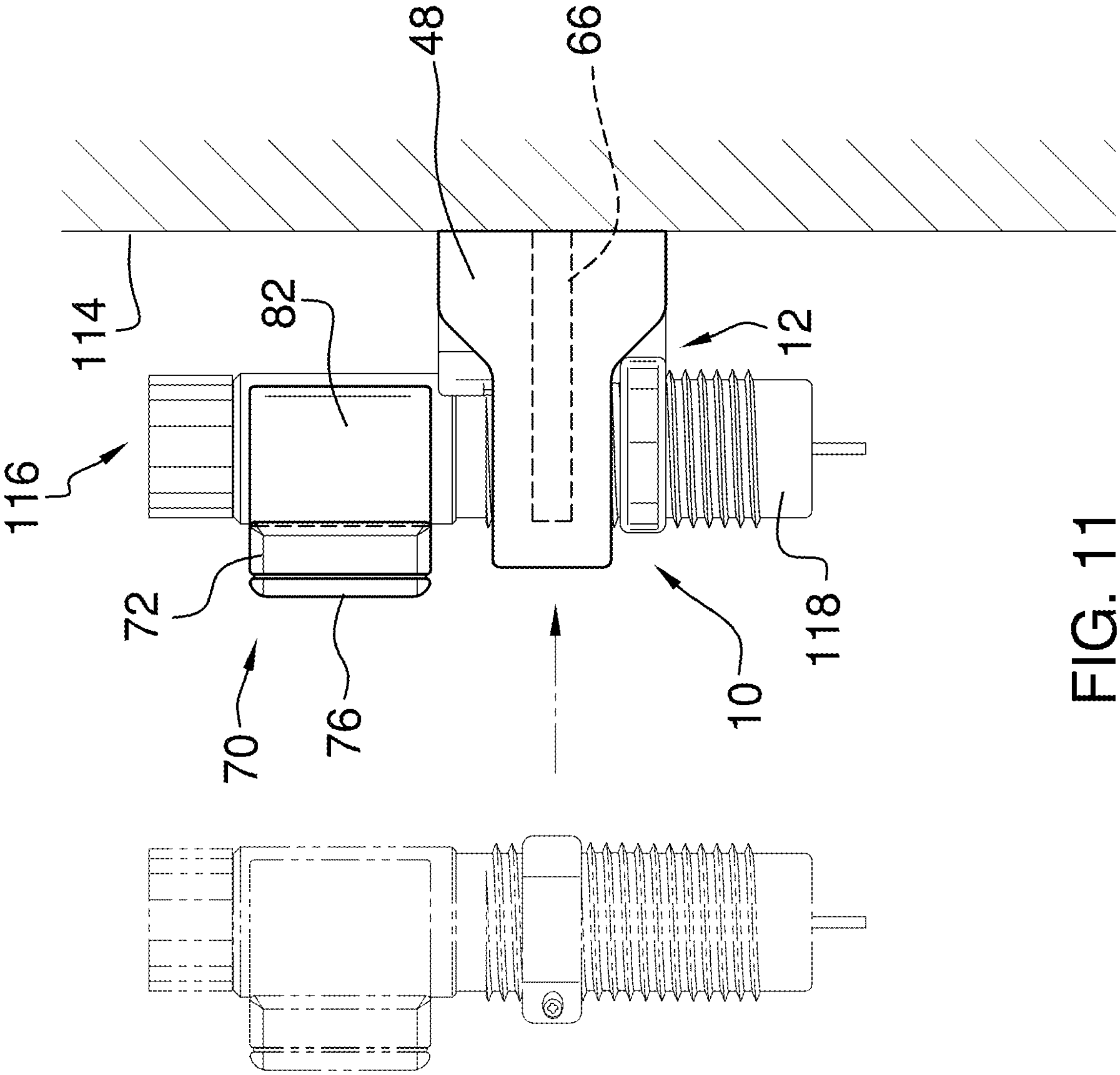
FIG. 11 is a side in-use view of an embodiment of the disclosure.

With reference now to the drawings, and in particular to FIGS. 1 through 11 thereof, a new tool rack embodying the principles and concepts of an embodiment of the disclosure and generally designated by the reference numeral 10 will be described.

As best illustrated in FIGS. 1 through 11, the modular tool rack kit 10 generally comprises a plurality of tool supports 12 for supporting reloading dies 116. Each tool support 12 of the plurality of tool supports 12 comprises a body 14 with a front side 16 and a back side 18, a top side 20 and a bottom side 22 which each extend between the front side 16 and the back side 18, and a first lateral side 24 and a second lateral side 26 which each extend between the front side 16 and the back side 18 and between the top side 20 and the bottom side 22. The body 14 comprises a base 28 and a receiver 30, wherein the base 28 extends between the back side 18 of the body 14 and the receiver 30, and the receiver 30 extends between the base 28 and the front side 16 of the body 14. The receiver 30 defines a notch 32 which is open on the front side 16 of the body 14. The notch 32 extends through the top side 20 and the bottom side 22 of the body 14 and is sized such that one of the reloading dies 116 may be inserted into the notch 32 in an upright fashion such that a shaft 118 of the reloading die 116 extends through the top side 20 and bottom side 22 of the body 14. The receiver 30 comprises a top lip 34 and a bottom lip 36 which extend into the notch 32. The top lip 34 and the bottom lip 36 define a trough 38 therebetween which accommodates a locking shaft collar 120 of the reloading die 116.

The bodies 14 of different tool supports 12 may be different in shape to accommodate different reloading dies 116. For example, notches 32 of different widths may be employed to accommodate and closely fit differently sized shafts 118. The troughs 38 formed between the top lip 34 and the bottom lip 36 of the various tool support 12 bodies 14 may have varying depths, thicknesses, and shapes to accommodate locking shaft collars 120 of varying sizes and shapes. The bodies 14 of some of the tool supports 12 may not define a trough and instead may rely solely on a portion of a particular reloading die lying against upper surfaces of the receivers 30 of the bodies 14. Chamfers or other contours may be present in the notch 32 of a particular tool support 12 to facilitate seating of one of the reloading dies 116 in the particular tool support 12. Some of the tool supports 12 may also differ in shape such that they accommodate other tools besides reloading dies.

The body 14 also defines a mounting hole 42 which extends through an inner surface 40 of the receiver 30, through the base 28, and through the back side 18 of the body 14. The mounting hole 42 may receive a screw, a nail, or other suitable fastener to mount the associated tool support 12 to a wall 114 or other support structure. In other embodiments, other fasteners such as magnets, hook-and-loop fasteners, latches, or the like may be used to secure the tool support 12 to a support structure.

A first connection member 44 and a second connection member 48 are coupled to the body 14. The first connection member 44 is positioned on the first lateral side 24 of the body 14, and the second connection member 48 is positioned on the second lateral side 26 of the body 14. The first connection member 44 of each tool support 12 of the plurality of tool supports 12 is removably couplable to a second connection member 48 of another tool support 12 of the plurality of tool supports 12. The first connection member 44 comprises a rail 46 which extends forwardly with respect to the body 14 from the back side 18 of the body 14, and the second connection member 48 defines a groove 50 complementary in shape to the rail 46. In other embodiments, the first connection member 44 and the second connection member 48 may include magnets, latches, snap fit connectors, or other fasteners to secure adjacent tool supports 12 together.

A tool clamp 52 is coupled to the body 14. The tool clamp 52 comprises a pair of tool clamp jaws 54 which are spaced apart from each other to define a gap 56 therebetween. The tool clamp jaws 54 are resiliently bendable, and the gap 56 is sized and configured to accommodate the reloading die 116 therein. When one of the reloading dies 116 is inserted into the gap 56 of the tool clamp 52, the tool clamp jaws 54 bend away from each other and snap around the inserted reloading die 116 to clamp onto the inserted reloading die 116. The tool clamp 52 is positioned below the receiver 30 with respect to the body 14. Some of the tool supports 12 may not have a tool clamp 52. In some embodiments, the tool clamps 52 are removably attached to the bodies 14 of their respective tool supports 12 via threaded fasteners, latches, snap fit connectors, or the like.

A first end cap 58 is couplable to the first connection member 44 of each tool support 12 via a cap groove 60 which is complementary in shape to the rail 46 of the first connection member 44. The first end cap 58 has an outer face 62 which faces away from a selected tool support 12 of the plurality of tool supports 12 when the first end cap 58 is coupled to the first connection member 44 of the selected tool support 12. A second end cap 64 is couplable to the second connection member 48 of each tool support 12 via a cap rail 66 which is complementary in shape to the groove 50 of the second connection member. The second end cap 64 has an outward face 68 which faces away from a chosen tool support 12 of the plurality of tool supports 12 when the second end cap 64 is coupled to the second connection member 48 of the chosen tool support 12.

The outer face 62 of the first end cap 58 and the outward face 68 of the second end cap 64 are planar. However, in other embodiments, the outer face 62 of the first end cap 58 and the outward face 68 of the second end cap 64 may be rounded, irregularly contoured, textured, or any other suitable structure. A purpose of the first end cap 58 and the second end cap 64 is to provide an outward-facing surface to an assembly 108 of multiple tool supports 12 that is different, and likely smoother, than an exposed rail 46 or groove 50.

Label holders are provided which may be used to secure a label 122 to a reloading die 116 when the reloading die 116 is held by one of the tool supports 12. Two label holders are depicted in the figures, including a framed label holder 70 and a windowed label holder 86. The framed label holder 70 comprises a display member 72 which has a display surface 74 that is planar. In other embodiments, the display surface 74 may be rounded or otherwise contoured. A frame 76 is mountable to the display surface 74 and may be used to secure the label 122 against the display surface 74. The frame 76 defines a viewing aperture 78 which extends through the frame 76 and facilitates viewing of the label 122 through the viewing aperture 78 when the frame 76 secures the label 122 against the display surface 74. In some embodiments, a transparent material may be incorporated into the viewing aperture 78 to further protect the label 122. Connection holes 80 extend through the frame 76 and into the display surface 74 such that threaded fasteners may secure the frame 76 to the display surface 74 of the display member 72. In other embodiments, magnets, latches, or other suitable fasteners may be used to secure the frame 76 to the display member 72.

A framed label clamp 82 is coupled to the display member 72 opposite the display surface 74. The framed label clamp 82 comprises a pair of framed label jaws 84 which are spaced apart from each other and are resiliently bendable. The framed label clamp 82 has a snap fit with the reloading dies 116 such that the framed label clamp 82 may be used to secure the framed label holder 70 to one of the reloading dies 116. Other embodiments may include other types of clamps, latches, magnets, or other suitable fasteners.

The windowed label holder 86 comprises a presentation member 88 which has a front portion 90 and a rear portion 92. The presentation member 88 defines a slot 94 between the front portion 90 and the rear portion 92 which is sized and configured to accommodate the label 122. The slot 94 is open at a top end 100 of the presentation member 88 to allow the label 122 to be inserted and removed therethrough. The front portion 90 defines a viewing window 96 which extends through the front portion 90 into the slot 94, facilitating viewing of the label 122 when the label 122 is held in the slot 94. Similarly to the framed label holder 70, a transparent material may be incorporated into the viewing window 96 to further protect the label 122.

The presentation member 88 has a cylindrical tubular shape which defines a channel 98 therein. The channel 98 extends through the top end 100 and a bottom end 102 of the presentation member 88 and is sized to accommodate one of the reloading dies 116. The presentation member 88 has a pair of end portions 104 which define a space 106 therebetween, and the presentation member 88 is resiliently bendable such that the end portions 104 may be drawn toward each other to cinch the presentation member 88. Cinching holes 106 extend through the end portions 104 such that threaded fasteners or other suitable cinching means may be inserted through the cinching holes 106 and operated to draw the end portions 104 together. In other embodiments, a latch or other suitable fastener may be incorporated which draws the end portions 104 together. In yet other embodiments, other clamping or securement devices may be used to attach the presentation member 88 to one of the reloading dies 116.

In use, the tool supports 12 may be connected together to form an assembly 108 of tool supports 12. The figures depict assemblies 108 in which the tool supports 12 follow a linear path. However, the tool supports 12 may follow an arced path, a circuitous path, or other suitable path when assembled together. The assembly 108 results in an exposed first connection member 44 at a first end 110 of the assembly 108 and an exposed second connection member 48 at a second end 112 of the assembly 108, which may be capped off by the first end cap 58 and the second end cap 64 respectively. The assembly 108 may be mounted to a wall 114 or other support structure via threaded fasteners, nails, or the like being applied through one or more of the mounting holes 42 of the tool supports 12.

Reloading dies 116 may be added to and held by the assembly 108 by attaching each reloading die 116 to one of the tool supports 12. A reloading die 116 may be positioned such that its locking shaft collar 120 seats in the groove 50 between the top lip 34 and the bottom lip 36 of the receiver 30 and the shaft 118 of the reloading die 116 snaps into the tool clamp 52 and extends through the notch 32 of the receiver 30. One of the label holders 70, 86 may be secured to the shaft 118 of the reloading die 116 and may hold onto the label 122. The label 122 may be affixed with indicia to identify the reloading die 116 to which the label holder is attached.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A modular tool rack kit comprising: a plurality of tool supports, each tool support comprising a body, the body having a front side and a back side, the body having a top side and a bottom side each extending between the front side and the back side, the body having a first lateral side and a second lateral side which each extend between the front side and the back side and between the top side and the bottom side, the body comprising a base and a receiver, the base extending between the back side of the body and the receiver, the receiver extending between the base and the front side of the body, the receiver defining a notch which is open on the front side of the body, the notch extending through the top side and the bottom side of the body, the notch being sized and configured to receive a reloading die therein; wherein, the receiver of the tool support comprises a top lip and a bottom lip which extend into the notch; wherein the tool support further comprises a tool clamp coupled to the body, the tool clamp comprising a pair of tool clamp jaws, the tool clamp jaws being spaced apart from each other to define a gap therebetween, the tool clamp jaws being resiliently bendable, the gap being sized and configured to accommodate the reloading die therein, the tool clamp being positioned below the receiver with respect to the body; a first connection member and a second connection member coupled to the body, the first connection member being positioned on the first lateral side of the body, the second connection member being positioned on the second lateral side of the body, the first connection member of each tool support of the plurality of tool supports being removably couplable to a second connection member of another tool support of the plurality of tool supports; and wherein the first connection member comprises a rail, the second connection member defining a groove complementary in shape to the rail, the rail extending forwardly with respect to the body from the back side of the body.

2. The modular tool rack kit of claim 1, wherein the body of the tool support comprises a mounting hole which extends through an inner surface of the receiver, through the base, and through the back side of the body.

3. The modular tool rack kit of claim 1, further comprising: a first end cap couplable to the first connection member of the tool support, the first end cap having an outer face which faces away from the tool support when the first end cap is coupled to the first connection member of the tool support; and a second end cap couplable to the second connection member of the tool support, the second end cap having an outward face which faces away from the tool support when the second end cap is coupled to the second connection member of the tool support.

4. The modular tool rack of claim 3, wherein:

the outer face of the first end cap is planar; and the outward face of the second end cap is planar.

5. The modular tool rack kit of claim 1, further comprising a label holder, the label holder being configured to secure a label to the reloading die.

6. The modular tool rack kit of claim 5, wherein the label holder comprises:

a display member having a display surface; and a frame mountable to the display surface, the frame being configured to secure the label against the display surface, the frame defining a viewing aperture which extends therethrough.

7. The modular tool rack kit of claim 6, wherein the display surface is planar.

8. The modular tool rack kit of claim 5, wherein the label holder comprises a label clamp, the label clamp comprising a pair of framed label jaws which are spaced apart from each other, the framed label jaws being resiliently bendable.

9. The modular tool rack kit of claim 5, wherein the label holder comprises a presentation member having a front portion and a rear portion, the presentation member defining a slot between the front portion and the rear portion, the slot being sized and configured to accommodate the label, the slot being open at a top end of the presentation member, the front portion defining a viewing window which extends therethrough into the slot.

10. The modular tool rack kit of claim 9, wherein the presentation member has a tubular shape which defines a channel therein, the channel extending through the top end and a bottom end of the presentation member.

11. The modular tool rack kit of claim 10, wherein the presentation member has a pair of end portions which define a space therebetween, the presentation member being resiliently bendable such that the end portions may be drawn toward each other to cinch the presentation member.

12. A modular tool rack kit comprising:

a plurality of tool supports, each tool support of the plurality of tool supports comprising:

a body having a front side and a back side, the body having a top side and a bottom side each extending between the front side and the back side, the body having a first lateral side and a second lateral side which each extend between the front side and the back side and between the top side and the bottom side, the body comprising a base and a receiver, the base extending between the back side of the body and the receiver, the receiver extending between the base and the front side of the body, the receiver defining a notch which is open on the front side of the body, the notch extending through the top side and the bottom side of the body, the notch being sized and configured to receive a reloading die therein, the receiver comprising a top lip and a bottom lip which extend into the notch, the body defining a mounting hole which extends through an inner surface of the receiver, through the base, and through the back side of the body;

a first connection member and a second connection member coupled to the body, the first connection member being positioned on the first lateral side of the body, the second connection member being positioned on the second lateral side of the body, the first connection member of each tool support of the plurality of tool supports being removably couplable to a second connection member of another tool support of the plurality of tool supports, the first connection member comprising a rail, the second connection member defining a groove complementary in shape to the rail, the rail extending forwardly with respect to the body from the back side of the body; and a tool clamp coupled to the body, the tool clamp comprising a pair of tool clamp jaws, the tool clamp jaws being spaced apart from each other to define a gap therebetween, the tool clamp jaws being resiliently bendable, the gap being sized and configured to accommodate the reloading die therein, the tool clamp being positioned below the receiver with respect to the body;

a first end cap couplable to the first connection member of each tool support, the first end cap having an outer face which faces away from a selected tool support of the plurality of tool supports when the first end cap is coupled to the first connection member of the selected tool support, the outer face being planar; and a second end cap couplable to the second connection member of each tool support, the second end cap having an outward face which faces away from a chosen tool support of the plurality of tool supports when the second end cap is coupled to the second connection member of the chosen tool support, the outward face being planar;

a pair of label holders, each label holder being configured to secure a label to the reloading die, the pair of label holders including:

a framed label holder comprising:

a display member having a display surface, the display surface being planar;

a frame mountable to the display surface, the frame being configured to secure the label against the display surface, the frame defining a viewing aperture which extends therethrough; and a framed label clamp coupled to the display member opposite the display surface, the framed label clamp comprising a pair of framed label jaws which are spaced apart from each other, the framed label jaws being resiliently bendable; and a windowed label holder comprising:

a presentation member having a front portion and a rear portion, the presentation member defining a slot between the front portion and the rear portion, the slot being sized and configured to accommodate the label, the slot being open at a top end of the presentation member, the front portion defining a viewing window which extends therethrough into the slot, the presentation member having a tubular shape which defines a channel therein, the channel extending through the top end and a bottom end of the presentation member, the presentation member having a pair of end portions which define a space therebetween, the presentation member being resiliently bendable such that the end portions may be drawn toward each other to cinch the presentation member.

* * * * *